(12) United States Patent
Hawver et al.

(10) Patent No.: US 9,787,602 B2
(45) Date of Patent: Oct. 10, 2017

(54) METHOD AND APPARATUS FOR DELEGATING RESOURCES BETWEEN DEVICES

(71) Applicant: STEELSERIES APS, Valby (DK)

(72) Inventors: Bruce Hawver, Hawthorn Woods, IL (US); Michael Aronzon, Vaughan (CA)

(73) Assignee: STEELSERIES ApS, Frederiksberg (DK)

( * ) Notice: Subject to any disclaimer, the term of this patent is extended or adjusted under 35 U.S.C. 154(b) by 105 days.

(21) Appl. No.: 14/730,710

(22) Filed: Jun. 4, 2015

(65) Prior Publication Data

US 2015/0271095 A1 Sep. 24, 2015

Related U.S. Application Data

(63) Continuation of application No. 13/625,187, filed on Sep. 24, 2012, now Pat. No. 9,083,658.

(51) Int. Cl.
| | |
|---|---|
| *H04L 12/917* | (2013.01) |
| *H04L 29/06* | (2006.01) |
| *A63F 13/21* | (2014.01) |
| *A63F 13/235* | (2014.01) |
| *A63F 13/26* | (2014.01) |
| *A63F 13/323* | (2014.01) |
| *H04L 29/08* | (2006.01) |

(52) U.S. Cl.
CPC ............ *H04L 47/76* (2013.01); *A63F 13/21* (2014.09); *A63F 13/235* (2014.09); *A63F 13/26* (2014.09); *A63F 13/323* (2014.09); *H04L 67/10* (2013.01); *H04L 67/38* (2013.01)

(58) Field of Classification Search
CPC .................................. H04L 47/76; H04L 67/10
USPC ......................................................... 709/226
See application file for complete search history.

(56) References Cited

U.S. PATENT DOCUMENTS

| | | |
|---|---|---|
| 6,105,098 A | 8/2000 | Ninose et al. |
| 6,920,633 B1 | 7/2005 | Venkatraman et al. |
| 7,653,684 B2 | 1/2010 | Bendapudi et al. |
| 7,677,979 B2 | 3/2010 | Van Luchene |
| 7,702,802 B2 | 4/2010 | Stillion et al. |
| 7,987,492 B2 | 7/2011 | Liwerant et al. |
| 8,376,835 B2 | 2/2013 | Ryan et al. |
| 2006/0068910 A1* | 3/2006 | Schmidt .................. A63F 13/10 709/203 |
| 2009/0239657 A1 | 9/2009 | Ryan et al. |

(Continued)

*Primary Examiner* — David Lazaro
*Assistant Examiner* — Zia Khurshid
(74) *Attorney, Agent, or Firm* — Guntin & Gust, PLC; Atanu Das

(57) ABSTRACT

A system performs operations including detecting a request to present a game application, receiving a resources identifier from a second communication device, determining from the resources identifier that the second communication device has one of a computing resource, a presentation resource, or both, selecting a configuration from a plurality of configurations according to an identity of the gaming application and the resources identifier, selecting according to the configuration at least one resource from one of the computing resource, the presentation resource, or both of the second communication device, and delegating processing by the first communication device of a portion of the gaming application according to the at least one resource of the second communication device.

19 Claims, 11 Drawing Sheets

(56) References Cited

U.S. PATENT DOCUMENTS

2012/0079562 A1    3/2012   Anttila et al.
2013/0084959 A1*  4/2013   Nelson ................ G07F 17/3218
                                                             463/25

* cited by examiner

500

600

700

METHOD AND APPARATUS FOR DELEGATING RESOURCES BETWEEN DEVICES

CROSS-REFERENCE TO RELATED APPLICATIONS

This application is a continuation of U.S. application Ser. No. 13/625,187, filed Sep. 24, 2012, which is incorporated herein by reference in its entirety.

FIELD OF THE DISCLOSURE

The subject disclosure relates generally to a method and apparatus for delegating resources between devices.

BACKGROUND

It is common today for consumers to make use of several platforms such as a computer, a smartphone, a tablet, or a gaming console for playing on-line or locally installed gaming applications. Some platforms have less sophisticated resources than others. For example, a smartphone or tablet may not have a graphics accelerator as is commonly available in a computer or gaming console. As such, games that require substantial video processing resources may not perform as well in smartphones or tablets, as they would with a computer or gaming console. The same can be said of other types of software applications executed by the foregoing devices.

BRIEF DESCRIPTION OF THE DRAWINGS

Reference will now be made to the accompanying drawings, which are not necessarily drawn to scale, and wherein.

DETAILED DESCRIPTION

Figure 1:
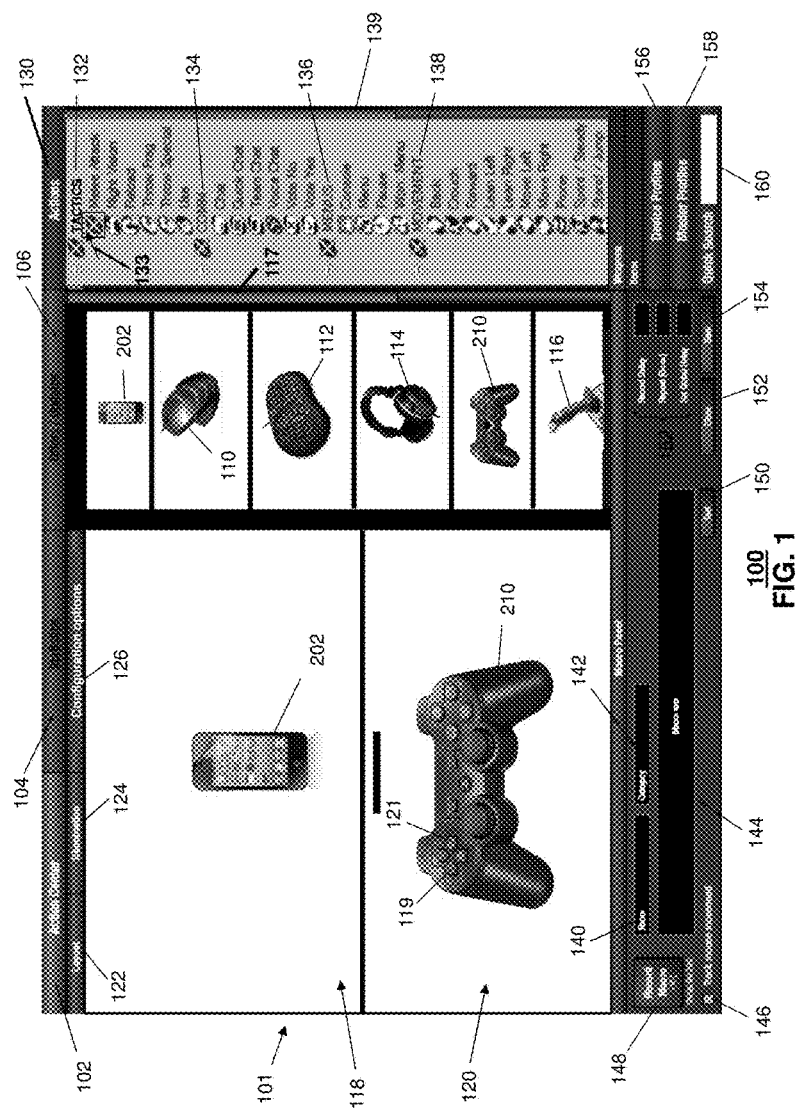
FIG. 1 depicts an illustrative embodiment of a Graphical User Interface (GUI) generated by an Accessory Management Software (AMS) application according to the subject disclosure.

The subject disclosure describes, among other things, illustrative embodiments for sharing resources between communication devices. Other embodiments are contemplated by the subject disclosure.

One embodiment of the subject disclosure can entail a method for receiving a configuration for selecting computing resources and presentation resources of other communication devices, storing the configuration according to the identity of the gaming application, detecting a second communication device in a vicinity of the first communication device, receiving a resources identifier from the second communication device, and determining from the resources identifier that the second communication device has one of a computing resource, a presentation resource, or both that is superior in performance to at least one resource of the first communication device.

The method can further include detecting execution of the game application, retrieving the configuration according to the identity of the gaming application, selecting according to the configuration at least one resource from one of the computing resource, the presentation resource, or both of the second communication device, and delegating processing of a portion of the gaming application to the at least one resource of the second communication device. The configuration can be associated with an identity of a gaming application.

One embodiment of the subject disclosure can entail a computer-readable storage medium, comprising computer instructions, which responsive to being executed by a processor, causes the processor to perform operations comprising detecting a request to present a game application, receiving a resources identifier from a second communication device, determining from the resources identifier that the second communication device has one of a computing resource, a presentation resource, or both, selecting a configuration from a plurality of configurations according to an identity of the gaming application and the resources identifier, selecting according to the configuration at least one resource from one of the computing resource, the presentation resource, or both of the second communication device, and delegating processing by the first communication device of a portion of the gaming application according to the at least one resource of the second communication device.

One embodiment of the subject disclosure can entail a first communication device, comprising a memory storing instructions, and a controller coupled to the memory. Responsive to executing the instructions the controller can perform operations including transmitting a resources identifier to a second communication device that utilizes the resource identifier to identify resources of the first communication device that can be delegated for use by the second communication device, receiving a signal from the second communication device, wherein the signal identifies one or more resources of the first communication device to be delegated for processing a portion of a software application used by the second communication device, receiving data to enable processing of the portion of the software application delegated to the one or more resources of the first communication device, and processing the data to initiate the delegation of the one or more resources of the first communication device.

FIG. 1 depicts an illustrative embodiment of a Graphical User Interface (GUI) generated by an Accessory Management Software (AMS) application according to the subject disclosure. The AMS application can be executed by a computing device such as a desktop computer, a laptop computer, a server, a mainframe computer, a gaming console, a gaming accessory, or combinations of portions thereof. The AMS application can also be executed by portable computing devices (with computing resources) such as a cellular phone, a personal digital assistant, a smartphone, a tablet, or a media player. Other devices with suitable computing resources can be used.

Figure 2:
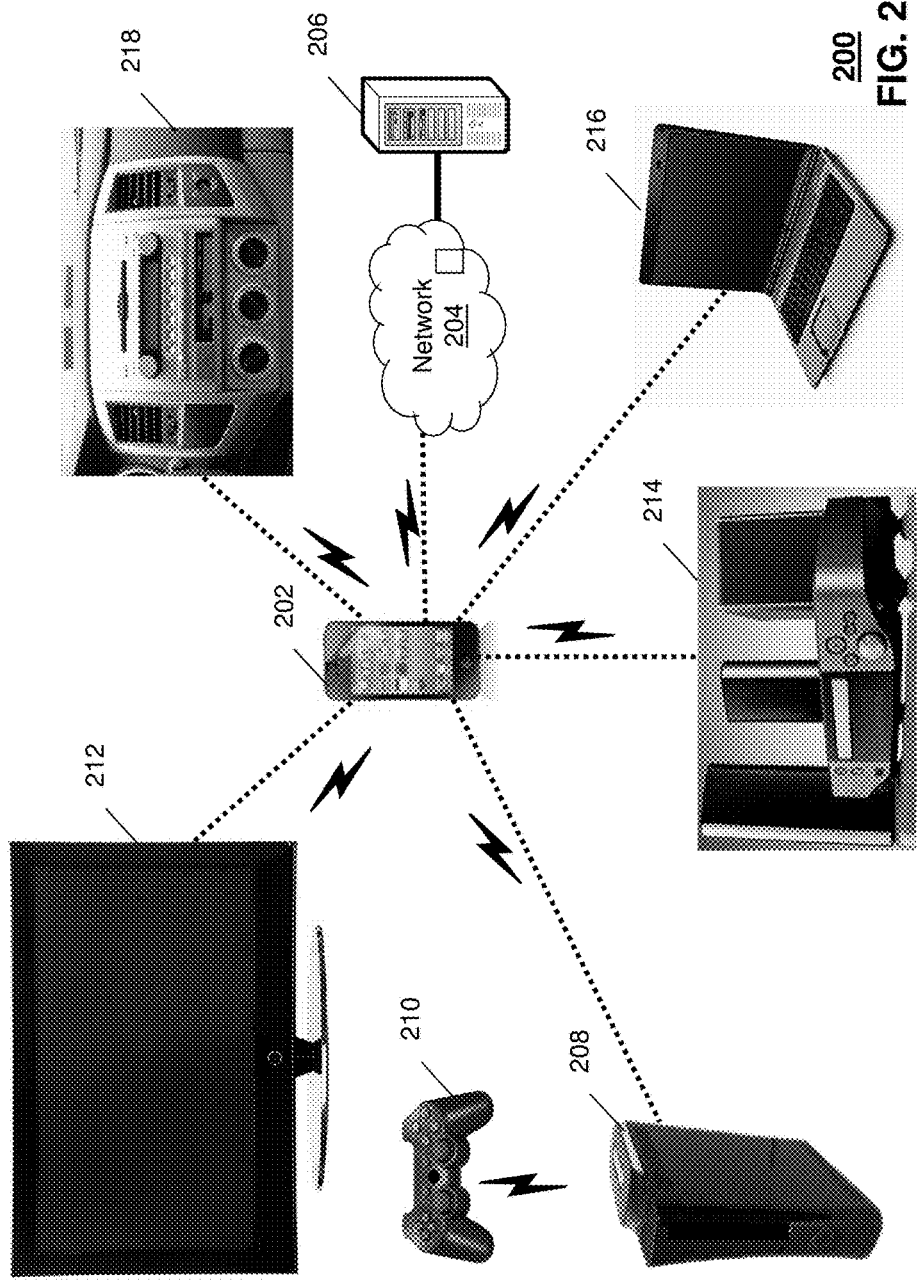
FIGS. 2-3 depict illustrative embodiments for pairing devices and sharing resources thereof to enhance user experience when processing a software application.

FIG. 2 illustrates a system 200 in which a communication device 202 can delegate processing of at least a portion of a software application to resources of other devices. A software application in the present context can represent software that makes use of computing, and/or presentation resources of any kind. A software application in the present context can represent software used in any context or setting such as, for example, entertainment (video game, music, movies, etc.), education, business, and so on. The communication device 202 of FIG. 2 represents a mobile phone such as a smartphone. The communication device 202 of FIG. 2 can, however, be replaced with other communication devices such as a tablet, a laptop computer, or other types of computing and presentation devices.

In the illustration, the communication device 202 can be paired with other devices by a wired (e.g., USB cable) or wireless interface (e.g., Bluetooth, or WiFi). The communication device 202 can be configured to discover other communication devices in its vicinity such as a gaming console 208, a television 212, an audio entertainment system 214, a laptop computer 216, an automobile's entertainment system, and so on by way of a personal area network or other suitable network techniques. Once the communication device 202 establishes communications with other communication devices in the vicinity of the personal area network, the other communication devices can share resource identifiers with the communication device 202, which it can use to identify computing, and/or presentation resources that the other communication devices can delegate to communication device 202.

In one embodiment, the communication device 202 can determine which computing and/or presentation resources can be delegated by searching entries in a database indexed by each resource identifier provided to the communication device 202. The database can be stored locally in the communication device 202 or remotely at a server 206 accessible through a private or public network 204 such as the internet. The computing resources in the present context can mean central processing unit (CPU) features such as a processor type, number of core processors, clock rate, speed of instruction execution, or other metrics that can be used to determine processing resources. The computing resources can also identify available memory capacity, type of memory (hard drive vs. solid state memory such as Flash).

In one embodiment, other forms of computing resources can include a graphics processing unit (GPU), a graphics accelerator card or chip, model numbers, speed of execution, cache memory specifications, and so on. Other forms of computing resources can include a tuner for decoding encoded media content, audio processing resources such as an amplifier for processing and amplifying audio in a surround sound environment, and so on. In another embodiment, computer resources can further include resources for processing input stimuli such as a touch screen, a gaming controller such as reference 210, a microphone interface for capturing speech and/or background environment (such as a headset), etc.

Other forms of computing resources that can generally process data of any kind can be utilized by communication device 202 of FIG. 2.

Presentation resources can represent devices capable of presenting audio, visual or combined presentations such as a television, a speaker system, a display of a computer system, an automobile audio system, a display of an automobile, and so on. Other forms of presentation resources that can in general present any form of sensory information (sight, smell, taste, touch, and/or hearing) can be utilized by the communication device 202 of FIG. 2.

Figure 3:
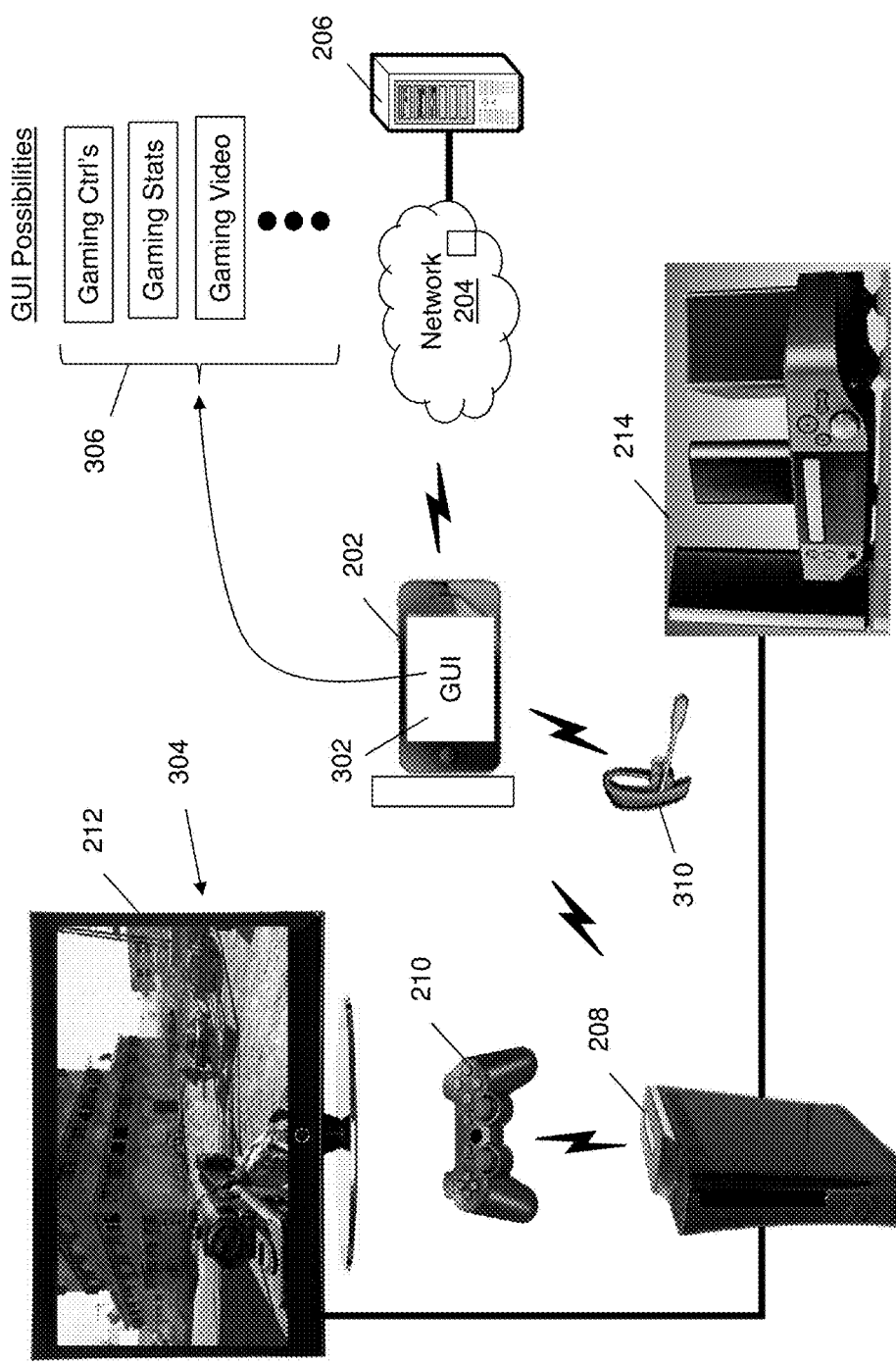

The communication device 202 can receive configurations (such as files, profiles, or any other forms of formatted data) from the server 206. Each configuration can be associated with a particular software application. A configuration can include information that instructs the communication device 202 how to delegate processing of portions of a software application to resources of other devices. For example, for a video game executed by the communication device 202, a configuration associated with the particular video game can provide information that identifies computing and presentation resources of other devices that can be used to enhance the computing and presentation performance of the video game. For instance, a communication device 202 that discovers the resources of FIG. 2 can be configured to delegate input processing, video processing, audio processing, and visual presentations to the gaming console 208, gaming controller 210, audio system 214, and TV 212, respectively, as illustrated in FIG. 3.

A configuration can include sub-configurations, each sub-configuration can identify a combination of preferred resources to use with other devices. Alternatively, or in combination, a configuration can list types of resources in priority order. For example, a TV screen may have a high priority than a computer screen if the TV has higher resolution, a gaming console may have a higher priority than the computing resources of a desktop or laptop computer, and s on. In another embodiment, the configuration identifies resources according to preferred operational parameters without identifying a specific device or model. For example, a configuration can provide that any device having a screen resolution at or above a certain pixel threshold should be selected, any device providing surround sound capability should be selected, and so on.

In yet another embodiment, the communication device 202 can determine a location of other devices relative to itself as a factor to select resources. The communication device 202 can determine the location of other devices based on coordinate information provided by other devices, analysis of communication signals exchanged with other devices to measure distance, triangulation of signals to determine location, or other suitable techniques to determine relative distances and arrangement of devices. In yet another embodiment, user input can be used to determine availability of other resources, their operating characteristics, and locations. A user can be presented with a configuration screen to identify location of resources relative to the communication device, types of resources, and their operating characteristics.

Depending on the resources discovered by the communication device 202 (automatically or by user input), the communication device 202 can use a configuration or sub-configuration, priority listing of resources, thresholds of operational parameters, and/or location of resources to select resources that improve the processing of the software application beyond the processing capabilities of the communication device 202 according to the environment that the communication device 202 finds itself in.

Delegation of processing of a video game can be direct or indirect. For example, in one embodiment the video game can be locally executed by the communication device 202. However, the communication device 202 can delegate presentation processing to the gaming console 208. This can be accomplished by the communication device 202 streaming the video portion and the audio portion of the video game to the gaming console 208. The gaming console 208 can perform video processing and audio processing and forward the results to the TV 212 and audio system 214, respectively. The TV 212 can present an enhanced video 304 as shown in FIG. 3. Additionally, the communication device 202 can delegate user input to the gaming controller 210.

The gaming controller 210 in turn can provide gaming stimuli to the gaming console 208 which forwards such information to the communication device 202 for controlling the video gaming application being executed by the communication device 202. The input stimuli are used by the video gaming application to adjust the video and audio streams being transmitted to the gaming console 208. In this embodiment, the communication device 202 performs execution of the video game, while delegating user input, and presentation processing to the gaming controller 210, the gaming console 208, the TV 212, and the audio system 214, respectively.

In other embodiments, execution of the gaming application can also be redirected. For example, the communication device 202 can forward a copy of the video game to the gaming console 208. The copy may be temporary and controlled by digital rights management criteria. In another embodiment, the communication device 202 may be receiving a stream of data from the remote server 206, where the stream is representative of the video game. In this embodiment, all or a portion of the streamed data can be redirected to the gaming console 208 over an internet connection, or a wireless port of the communication device 202.

In the foregoing embodiments, the communication device 202 can retain certain processing aspects of the video game such as a GUI interface 302 presented by the display of the communication device 202. Some aspects that can be retained might be gaming controls, gaming statistics, or portions of the video (e.g., macro views of enemy vs. teammates) as shown by reference 306.

For the foregoing embodiments computing and/or presentation processing of a video game (or other types of software applications) can be centrally processed (e.g., by the communication device 202) or distributed to other devices.

Figure 4:
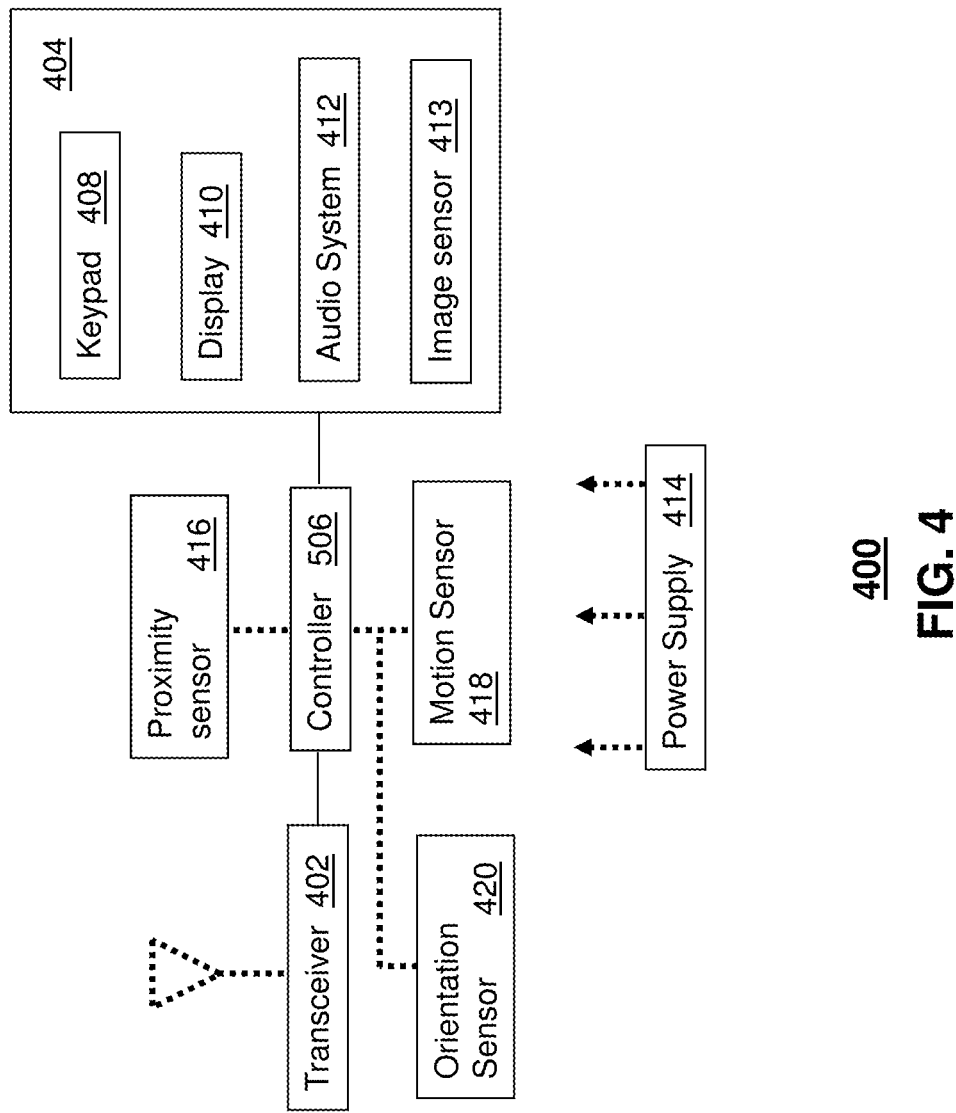
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1-3. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1x, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as a electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the subject disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate the implementation of the devices described by the subject disclosure. These variant embodiments are contemplated by the subject disclosure.

Figure 5A:
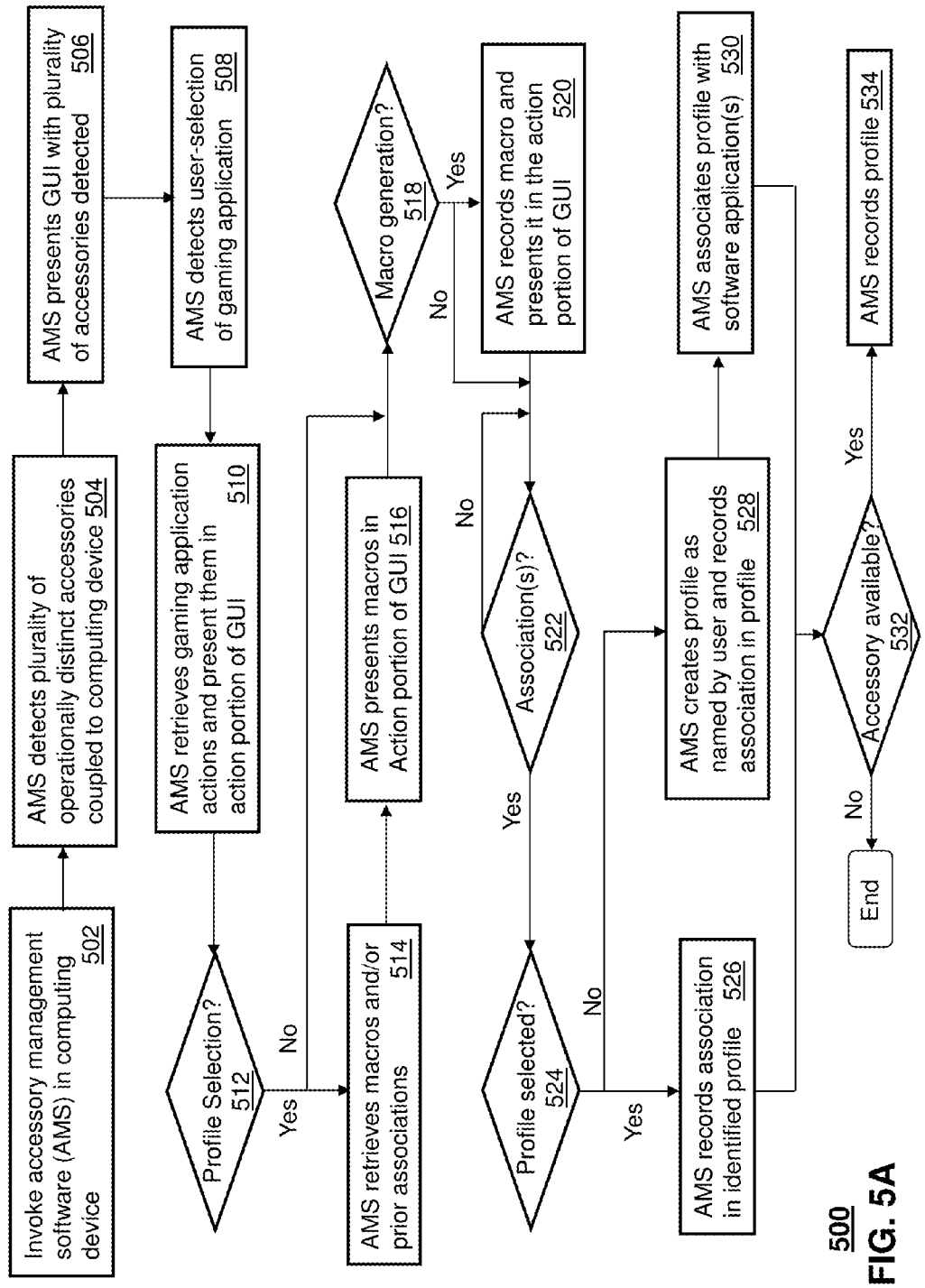
FIG. 5A depicts an illustrative embodiment of a first method utilized in the present disclosure.
Figure 5B:
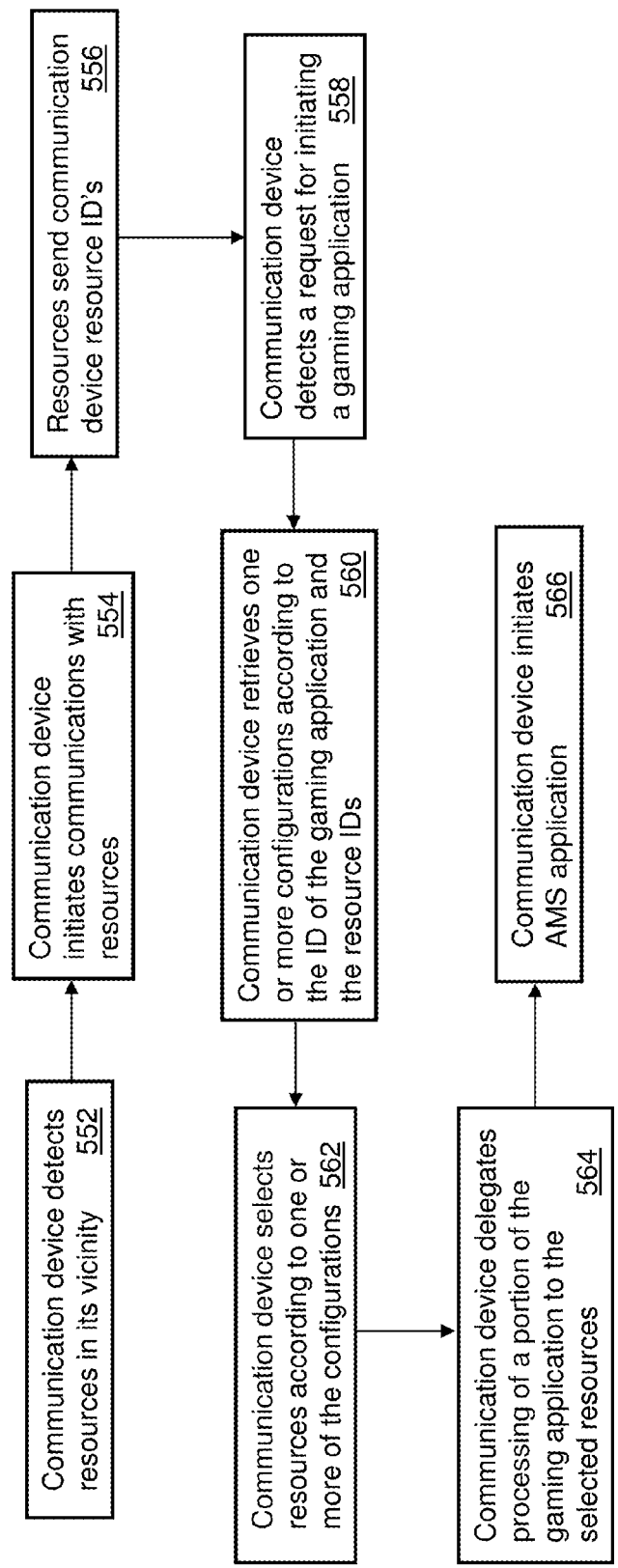
FIG. 5B depicts an illustrative embodiment of a second method utilized in the present disclosure.
Figure 6:
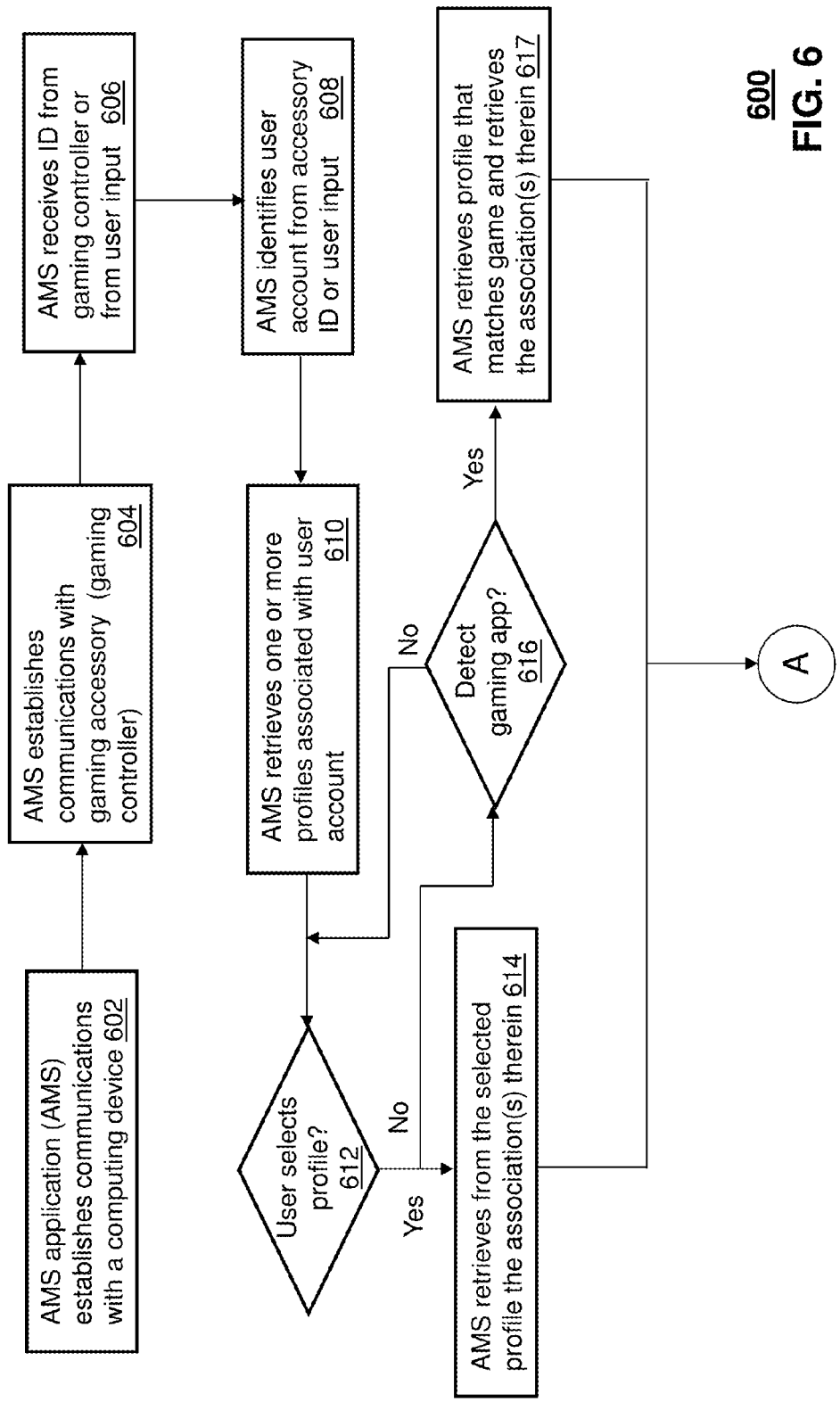
FIG. 6 depicts an illustrative embodiment of a third method utilized in the present disclosure.
Figure 7:
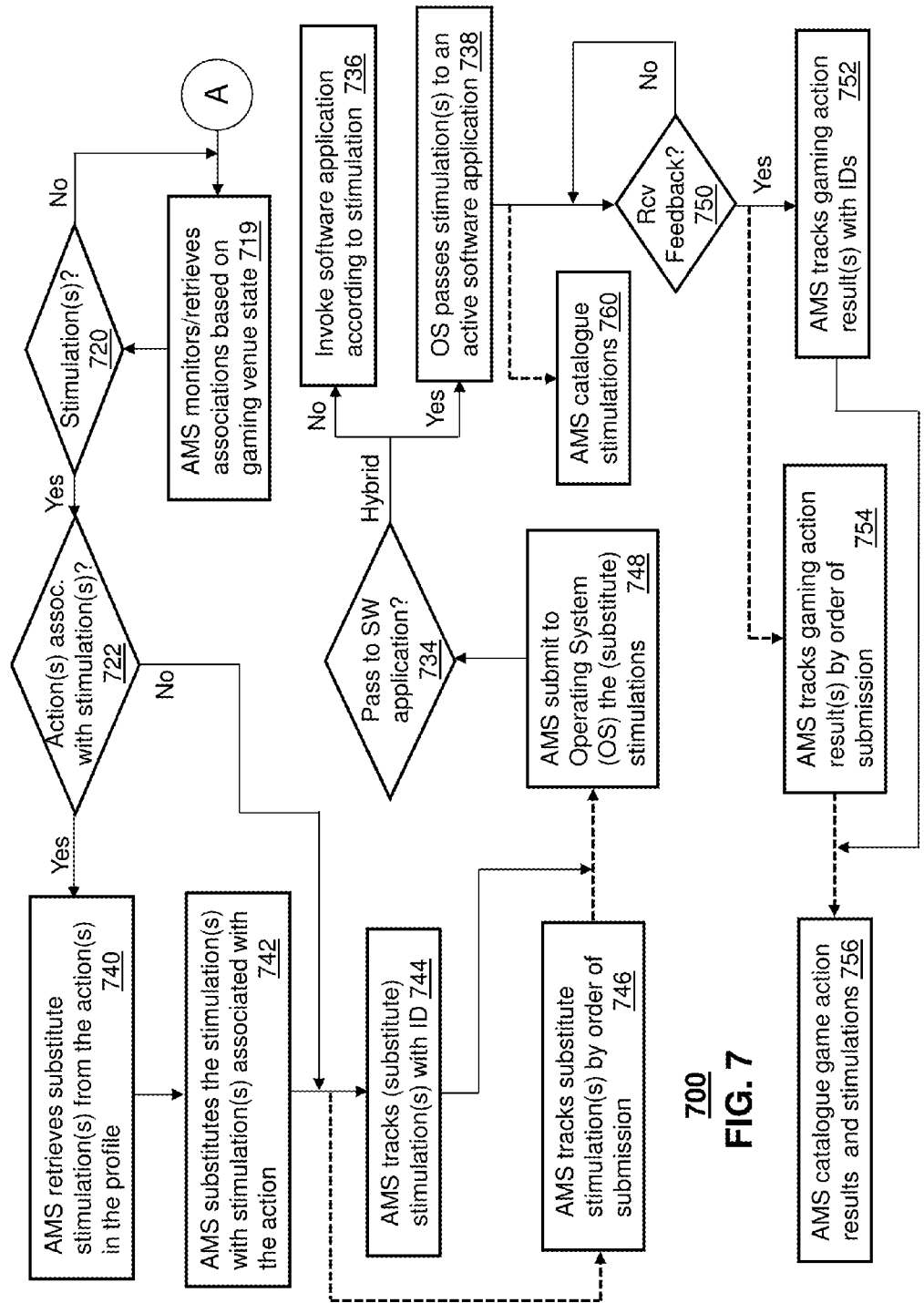
FIG. 7 depicts an illustrative embodiment of a fourth method utilized in the present disclosure.

FIGS. 5-7 depict methods 500-700 describing illustrative embodiments of the AMS application referred to in FIG. 1. Method 500 can begin with step 502 of FIG. 5A in which the AMS application is invoked in a device. The device can be the remote server 206, the gaming console 208 or the communication device 202 of FIGS. 2-3, or other devices not shown with computing resources. The invocation step can result from a user selection of the AMS application from a menu or iconic symbol presented on a screen of the device by an operating system (OS) managing operations thereof. In step 504, the AMS application can detect by way of drivers in the OS a plurality of operationally distinct accessories communicatively coupled to the device. The accessories can be coupled to the device by a tethered interface (e.g., USB cable), a wireless interface (e.g., Bluetooth or Wireless Fidelity—WiFi), or combinations thereof.

In the present context, an accessory can represent any type of device which can be communicatively coupled to the device (or an integral part of the device) and which can control aspects of the OS and/or a software application operating in the device. An accessory can represent for example a smartphone, a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 with operationally distinct accessories such as a smartphone 202, and a gaming controller 210. The GUI 101 presents the accessories 202, 110-114, 210, 116 in a scrollable section 117. One or more accessories can be selected by a user with a mouse pointer. In this illustration, the smartphone 202 and the gaming controller 210 (of FIGS. 2-3) were selected for customization. Upon selecting the smartphone 202 and the gaming controller 210 from the scrollable window of section 117, the AMS application presents the smartphone 202 and the gaming controller 210 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the gaming controller 210 to make an association with an input function of one of these accessories. Actions of one accessory can also be associated with another accessory that is of a different category or kind. For example, key depressions "Ctrl A" of a keyboard can be associated with one of the buttons of the gaming controller 210 (e.g., the left button 119).

In one embodiment, a Melee Attack action can be associated by dragging this action to either the left button 119 or right button 120 of the gaming controller 210. Thus, when the selected button is depressed, the stimulus signal that is generated by the selected button of the gaming controller 210 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 210 such as, for example, rapid movement or shaking of the gaming controller 210. In a further embodiment, the AMS application can be adapted to make associations with two dimensional or three dimensional movements of the gaming controller 210 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 210 downward can represent release of munitions such as a bomb.

In a gaming venue state where the gamer's avatar has entered a building, lifting of the gaming controller 210 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 210 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 210, recordable selections of buttons of the gaming controller 210, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 210, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the smartphone 202, buttons of the gaming controller 210, etc.).

In step 522, the AMS application can respond to drag and drop associations of actions and input functions of the gaming controller 210. Associations can also be made based on the two or three dimensional movements of the gaming controller 210. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 210 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIGS. 1-3 are programmable and available for programming. If the AMS application detects that the accessories (e.g., smartphone 202, gaming controller 210) are communicatively coupled to a computing device from which the AMS application is operating (e.g., gaming console 306) and programmable, the AMS application can proceed to step 534 of FIG. 5 where it submits the profile and its contents for storage in one of the accessories (e.g., the gaming controller 210 in FIGS. 2-3). Once the gaming controller 210 is programmed with the profile, the gaming controller 210 can perform stimuli substitutions according to the associations recorded by the AMS application in the profile. Alternatively, the AMS application can store the profile in the computing device 206 of FIGS. 2-3 and perform substitutions of stimuli supplied by the gaming controller 210 according to associations recorded in the profile by the AMS application.

The GUI 101 of FIG. 1 presented by the AMS application can have other functions. For example, the GUI 101 can provide options for layout of the accessory selected (button 122), how buttons of an accessory are illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

In addition to the above embodiments, the AMS application can serve to create configurations as described above for delegating resources of the smartphone 202 to other devices. For example, configurations can be based on known resources of other devices made available to the smartphone 202, general operational parameters for guiding the smartphone 202 on how to select resources discovered by the smartphone 202, and/or selecting resources based on the smartphone 202 determining its relative position to other devices in its vicinity. These configurations can be stored by the remote server 206, or by the AMS application in a storage device of another computing device (e.g., gaming console, or computer), or the smartphone 202 itself. Alternatively, or in combination, the configurations of any particular software application such as a video game can be created by the author or producer of the video game according to a model type of the smartphone 202 and model types of other devices and their respective resources known to the author or producer of the video game.

FIG. 5B depicts a process which can be used by the smartphone 202 to discover resources and initiate the AMS application. In step 552, the communication device (which in this illustration will be referred to as the smartphone 202) detects resources in its vicinity as described in reference to FIG. 2. The smartphone 202 in step 554 initiates communications with the resources by way of a wireless interface (e.g., Bluetooth or WiFi). The resources in turn can send their respective resource identifiers (IDs) to the smartphone 202 in step 556. At step 562, the smartphone 202 detects user input for invoking a software application such as a video game. At step 560, the smartphone 202 can retrieve one or more configuration according to an identification of the video game selected and the resources IDs received in step 556. The configurations can be retrieved from the remote server 206 of FIG. 2 or from a local memory of the smartphone 202. At step 562, the smartphone 202 can select one of the configurations based on the resources discovered in step 556, and consequently select resources according to instructions provided with the selected configuration. For example, the smartphone 202 can select an arrangement such as shown in FIG. 3 based on one of the configurations it retrieved in step 560, and the resources that were discovered by the smartphone 202. At step 564, the smartphone 202 can delegate processing of a portion of the video game to the resources selected in step 562. At step 566, the smartphone 202 can also invoke the AMS application to perform stimuli substitutions as previously described above while the video game is in session in a manner described by method 600 of FIG. 6.

FIG. 6 depicts a method 600 for illustrating the operations of the AMS application for the arrangement shown in FIG. 3. In the arrangement of FIG. 3, the AMS application can be operating in whole or in part from the smartphone 202, the gaming controller 210 (assuming it has computing resources), the gaming console 208, or the remote server 206. For illustration purposes, it is assumed the AMS application operates from the gaming console 208.

Method 600 begins after the smartphone 202 of FIG. 3 has delegated portions of processing of a selected video game to the gaming console 208 as described by the method steps of FIG. 5B. In this illustration, the gaming console 208 orchestrates video and audio processing via the TV 212 and the audio system 214. If the smartphone 202 retains execution of the video game, the gaming console 208 also collects and forwards to the smartphone 202 gaming stimuli generated by the gaming controller 210 to adjust the video game in real-time. If, on the other hand, execution of the video game is also delegated to the gaming console 208, then the gaming stimuli generated by the gaming controller 210 are processed by the gaming console 208.

In another embodiment, the smartphone 202 can retain audio bidirectional communications by way of, for example, a Bluetooth headset 310 which can be used for team chat or other suitable purposes. The audio input received by a microphone of the headset 310 can be transmitted to the gaming console 208 by way of the Bluetooth interface of the smartphone 202, or can be transmitted by the smartphone 202 by way of a cellular or WiFi network accessible to communication devices of other team players.

The AMS application initiates communications in steps 602 and 604 between the gaming console 208 and the gaming controller 210. These steps can represent for example a user starting the AMS application from the gaming console 208 and/or the user inserting at a USB port of the gaming console 208 a connector of a USB cable tethered to the gaming controller 210, which invokes the AMS application. In step 606, the gaming controller 210 can in turn provide the AMS application one or more accessory ID's, or the user can provide by way of a keyboard or the gaming controller 210 user identification. With the accessory ID's, or user input the AMS application can identify in step 608 a user account associated with the gaming controller 210. In step 610, the AMS application can retrieve one or more profiles associated with the user account.

In step 612, the user can be presented by way of the TV 212 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 208 or whether the gaming console 208 is communicating with the software gaming application by way of the smartphone 202 or the remote server 206. If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other forms of suitable associations that result in substitute stimulations. The accessory stimulations can be stimulations that are generated by the gaming controller 210, as well as stimulations from other accessories (e.g., headset 310), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 210 for controlling the tank.

The AMS application can process movements of the gaming controller 210 forwards, backwards, or sideways in two or three dimensions to control the tanks movement. Similarly, rotating the gaming controller 210 or tilting the gaming controller 210 forward can cause an accelerometer, gyro or magnetometer of the gaming controller 210 to provide navigational data to the AMS application which can be substituted with an action to cause the tank to turn and/or move forward. The profile retrieved by the AMS application can indicate that the greater the forward tilt of the gaming controller 210, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 210. For example, navigation data associated with a combination of a forward tilt and right bank of the gaming controller 210 can be substituted by the AMS application to cause an increase in forward speed of the tank with a turn to the right determined by the AMS application according to a degree of banking of the gaming controller 210 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 210 can be associated by the AMS application with weaponry selection, firing, reloading and so on. The movement of the gaming controller 210 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 210, and/or speech commands received by microphone of the headset 310.

The AMS application can monitor in step 720 stimulations generated by the accessories coupled to the gaming console 208. The stimulations can be generated by the gamer by manipulating the gaming controller 210, and/or by generating speech commands detected by the headset 310. If a simulation is detected at step 720, the AMS application can determine in step 722 whether to forward the detected stimulation(s) to an Operating System (OS) of the gaming console 208 without substitutions. This determination can be made by comparing the detected stimulation(s) to association in the profile. If the detected stimulation(s) match the associations, then the AMS application proceeds to step 740 where it retrieves substitute stimulation(s) in the profile. In step 742, the AMS application can substitute the detected stimulation(s) with the substitute stimulations in the profile. In one embodiment, the AMS application can track in step 744 the substitute stimulations by updating these stimulations with a unique identifier such as a globally unique identifier (GUID). In this embodiment, the AMS application can also add a time stamp to each substitute stimulation to track when the substitution was performed.

In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Once the stimulations received in step 720 have been substituted with other stimulations in step 742, and the AMS application has chosen a proper tracking methodology for correlating gaming action results with stimulations, the AMS application can proceed to step 748 and submit the substitute stimulations to the OS of the gaming console 208. If in step 722 the detected stimulation(s) do not match an association in the profile, then the AMS application proceeds to one of steps 744 or 746 in order to track the stimulations of the accessory. Once the AMS application has performed the necessary steps to track the stimulation as originally generated by the accessory, the AMS application proceeds to step 748 where it submits stimulations (with or without substitutions) to the OS of the gaming console 208 with or without tracking information as previously described.

In step 734, the OS determines whether to invoke in step 736 a software application identified in the stimulation(s) (e.g., gamer says "turn on team chat", which invokes a chat application), whether to forward the received stimulations to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulations sent in step 738.

For instance, suppose the stimulation sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", which the AMS application can use in step 752 to identify the stimulation having the same ID. If on other hand, the order of game action results can be maintained consistent with the order of the stimulations, then the AMS application can correlate in step 754 stimulations with game action results by the order in which stimulation were submitted and the order in which game action results were received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

Figure 8:
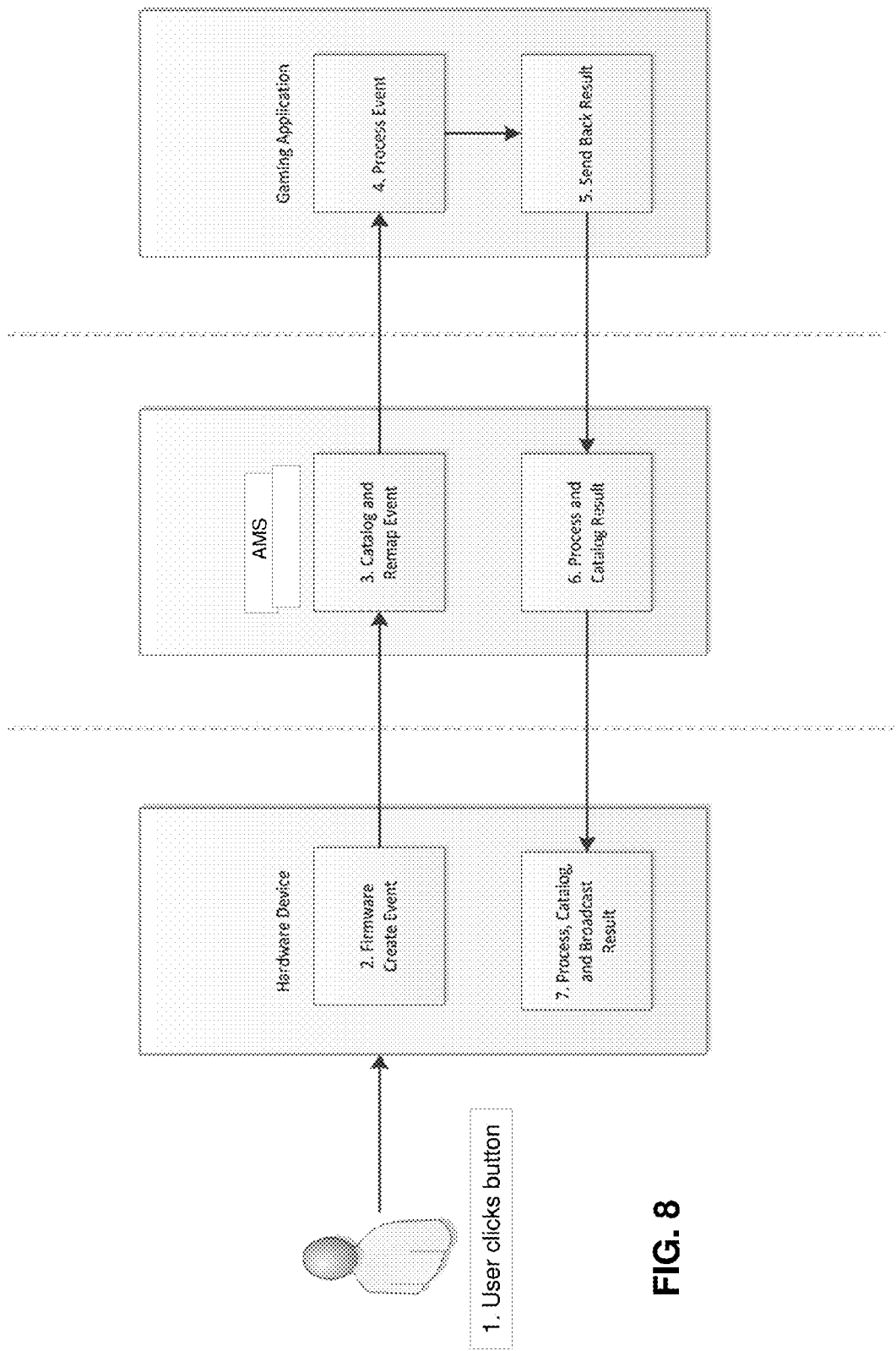
FIG. 8 depicts an illustrative embodiment of a system such as shown in FIGS. 2-3 operating at least in part according to the methods of FIGS. 5-7.
Figure 9:
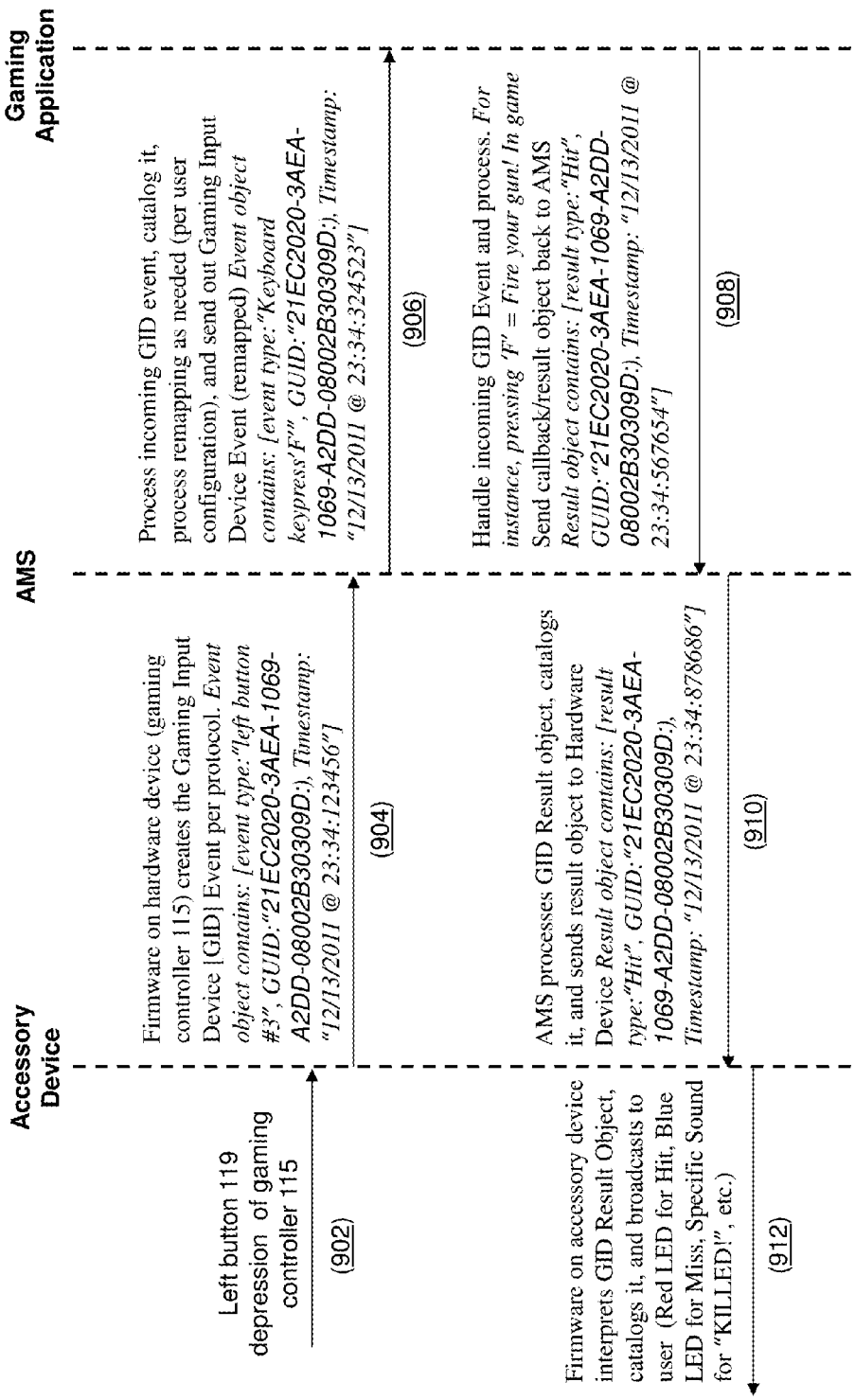
FIG. 9 depicts an illustrative embodiment of a communication flow diagram utilized by the system of FIGS. 2-3.

FIGS. 8-9 illustrate embodiments of a system with a corresponding communication flow diagram for correlating stimulations and gaming action results. In this illustration a user clicks the left button 119 of the gaming controller 210 of FIG. 1 (which is a representative embodiment of the gaming controller 310 of FIGS. 2-3). The gaming controller 210 can include firmware (or circuitry), which creates an event as depicted by event 2 in FIG. 8. The button depression and the event creation are depicted in FIG. 9 as steps 902 and 904.

In step 904, the firmware of the gaming controller 210 can, for example, generate an event type "left button #3", and a unique GUID with a time stamp which is submitted to the AMS application. Referring back to FIG. 8, the AMS application catalogues event 3, and if a substitute stimulation has been predefined, remaps the event according to the substitution. The remapped event is then transmitted to the gaming application at event 4. Event 3 of FIG. 8 is depicted as step 906 in FIG. 9. In this illustration, the AMS application substitutes the left button #3 depression stimulus with a "keyboard 'F'" depression which can be interpreted by the gaming application as a fire command. The AMS application in this illustration continues to use the same GUID, but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 908 in FIG. 9. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" with a new time stamp, while utilizing the same GUID for tracking purposes.

At step 910, the AMS application correlates the stimulation "left button #3 (and/or the substitute stimulation keyboard "F") to the game result "Hit" and catalogues them in memory. The AMS application then submits to the accessory (e.g., gaming controller 210) in step 910 the game action results "Hit" with the same GUID, and a new time stamp indicating when the result was received. Upon receiving the message from the AMS application, the accessory in step 912 processes the "Hit" by asserting a red LED on the accessory (e.g., left button 119 illuminates in red or other LED of the gaming controller 210 illuminates in red) to indicate a hit. Other notification notices can be used such as another color for the LED to indicate misses, a specific sound for a hit, or kill, a vibration or other suitable technique for notifying the gamer of the game action result.

The AMS application can catalogue and report the results to the user or to online social networks, which track the performance of garners.

Figure 10:
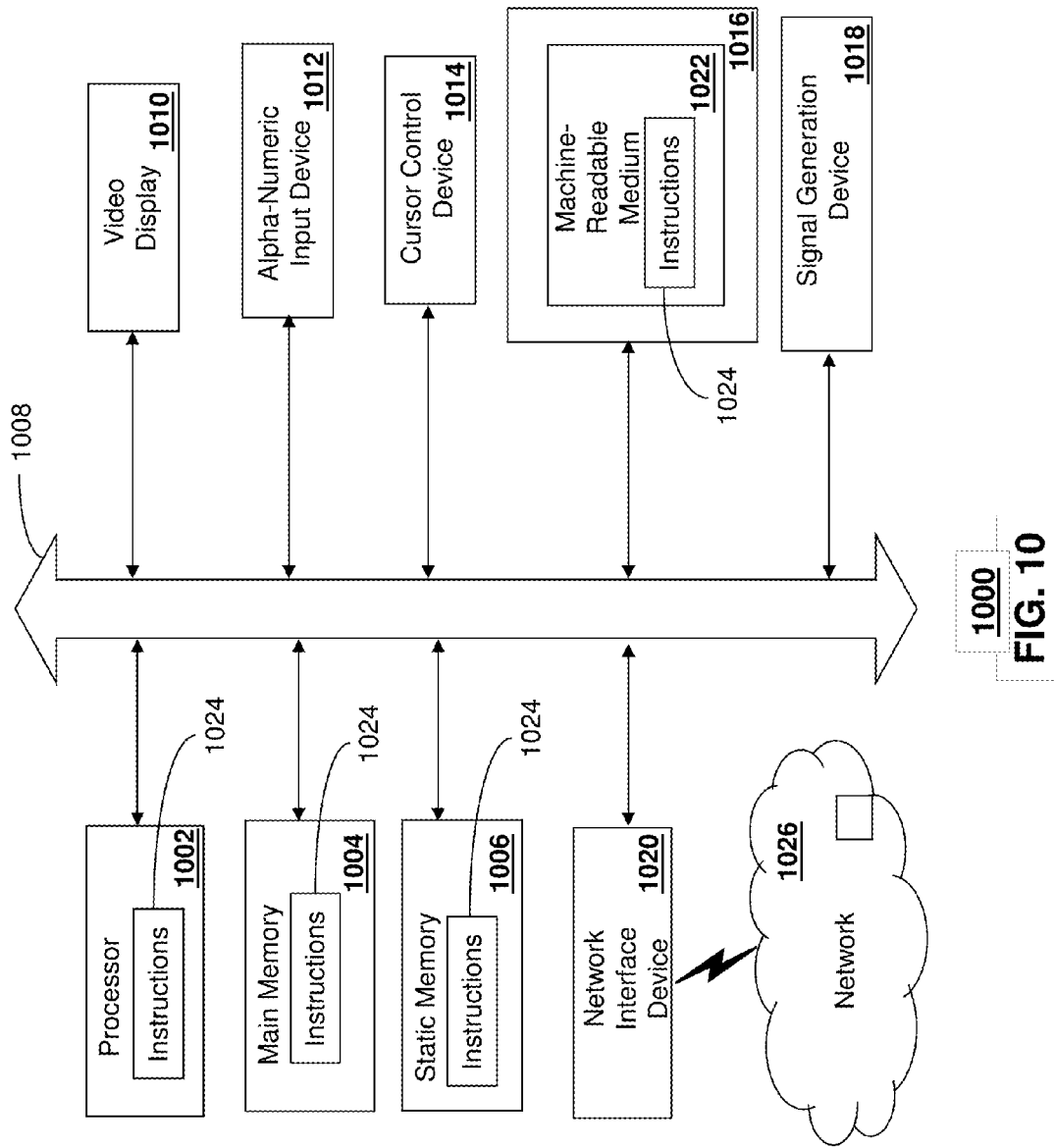
FIG. 10 depicts an illustrative diagrammatic representation of a machine in the form of a computer system within which a set of instructions, when executed, may cause the machine to perform any one or more of the methodologies disclosed herein.

FIG. 10 depicts an exemplary diagrammatic representation of a machine in the form of a computer system 1000 within which a set of instructions, when executed, may cause the machine to perform any one or more of the methods discussed above. One or more instances of the machine can operate as any of devices depicted in FIGS. 1-4. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a memory storing instructions; and
   a controller coupled to the memory, wherein responsive to executing the instructions the controller performs operations comprising:
   receiving a delegation, from a first gaming accessory separate from the device, to process a portion of a gaming application initiated at the first gaming accessory;
   initiating communications with a second gaming accessory separate from the device;
   receiving signals associated with gaming actions, the gaming actions generated by the second gaming accessory responsive to user input at the second gaming accessory, wherein the signals are generated according to a profile comprising associations between the gaming actions and input functions of the second gaming accessory; and
   processing video or audio signals associated with the gaming actions for presentation at a third gaming accessory,
   wherein the delegation is performed in accordance with a configuration of resources retrieved by the first gaming accessory according to an identity of the gaming application and a determination that the device has a capability corresponding to a computing resource, a presentation resource, or both that is superior with respect to the first gaming accessory.

2. The device of claim 1, wherein the first gaming accessory retains execution of the gaming application, and wherein the operations further comprise forwarding the signals generated by the second gaming accessory to the first gaming accessory.

3. The device of claim 1, wherein execution of the gaming application is delegated to the device, and wherein the operations further comprise processing the signals generated by the second gaming accessory.

4. The device of claim 1, wherein the configuration is based on a determination by the first gaming accessory of its relative position in a vicinity of the device.

5. The device of claim 1, wherein the signals generated by the second gaming accessory are based on movement of the second gaming accessory.

6. The device of claim 1, wherein the operations further comprise retrieving from the profile a substitute signal corresponding to the signal generated by the second gaming accessory.

7. The device of claim 1, wherein the profile is selected by a user from a plurality of profiles presented at the third gaming accessory.

8. The device of claim 7, wherein the third gaming accessory comprises a television.

9. The device of claim 1, wherein the device comprises a gaming console, the first gaming accessory comprises a smartphone, and the second gaming accessory comprises a gaming controller.

10. A method comprising:
receiving, by a gaming device comprising a processor, a delegation from a first gaming accessory to process a portion of a gaming application initiated at the first gaming accessory, the first gaming accessory being separate from the gaming device,
initiating, by the gaming device, communications with a second gaming accessory separate from the gaming device;
receiving, by the gaming device, signals associated with gaming actions, the signals generated by the second gaming accessory responsive to user input at the second gaming accessory;
processing video or audio signals associated with the gaming actions for presentation at a third gaming accessory,
wherein the delegation is performed in accordance with a configuration of resources retrieved by the first gaming accessory according to an identity of the gaming application, and
wherein the signals are generated according to a profile comprising associations between the gaming actions and input functions of the second gaming accessory.

11. The method of claim 10, wherein the delegation is performed in accordance with a determination that the gaming device has a capability corresponding to a computing resource, a presentation resource, or both that is superior with respect to the first gaming accessory.

12. The method of claim 10, wherein the configuration is based on a determination by the first gaming accessory of its relative position in a vicinity of the gaming device.

13. The method of claim 10, further comprising retrieving from the profile a substitute signal corresponding to the signal generated by the second gaming accessory.

14. The method of claim 10, wherein the first gaming accessory retains execution of the gaming application, and further comprising forwarding the signals generated by the second gaming accessory to the first gaming accessory.

15. The method of claim 10, wherein execution of the gaming application is delegated to the gaming device, and further comprising processing the signals generated by the second gaming accessory.

16. A machine-readable storage device comprising instructions, which responsive to being executed by a processor of a gaming device, cause the processor to perform operations comprising:
receiving a delegation from a first gaming accessory to process a portion of a gaming application initiated at the first gaming accessory, the first gaming accessory being separate from the gaming device;
initiating communications with a second gaming accessory separate from the gaming device;
receiving signals associated with gaming actions, the signals generated by the second gaming accessory responsive to user input at the second gaming accessory;
processing video or audio signals associated with the gaming actions for presentation at a third gaming accessory,
wherein the signals are generated according to a profile comprising associations between the gaming actions and input functions of the second gaming accessory.

17. The machine-readable storage device of claim 16, wherein the delegation is performed in accordance with a configuration of resources retrieved by the first gaming accessory according to an identity of the gaming application, and wherein the configuration is based on a determination by the first gaming accessory of its relative position in a vicinity of the gaming device.

18. The machine-readable storage device of claim 16, wherein the delegation is performed in accordance with a determination that the gaming device has a capability corresponding to a computing resource, a presentation resource, or both that is superior with respect to the first gaming accessory.

19. The machine-readable storage device of claim 16, wherein the operations further comprise retrieving from the profile a substitute signal corresponding to the signal generated by the second gaming accessory.

* * * * *